March 13, 1934.  R. W. PARKINSON  1,950,694
CLUTCH FOR MOTOR VEHICLES
Filed June 1, 1931
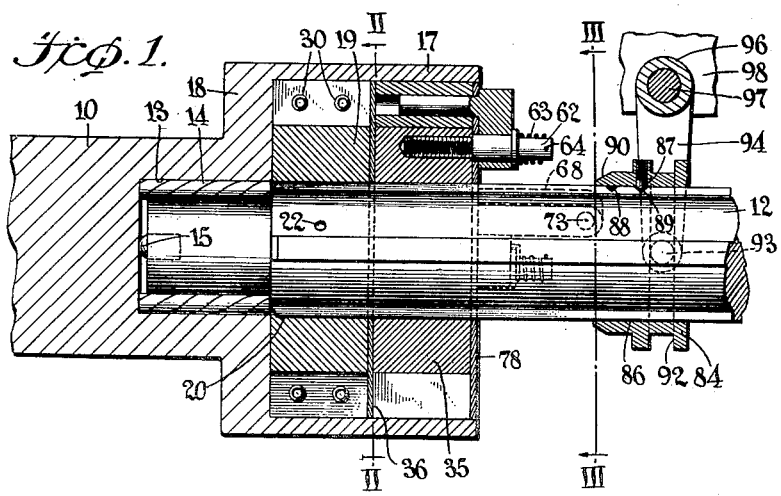
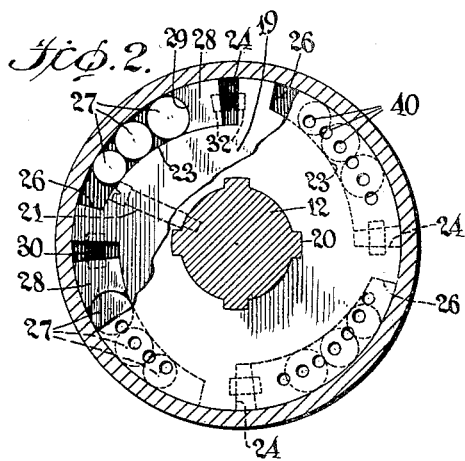
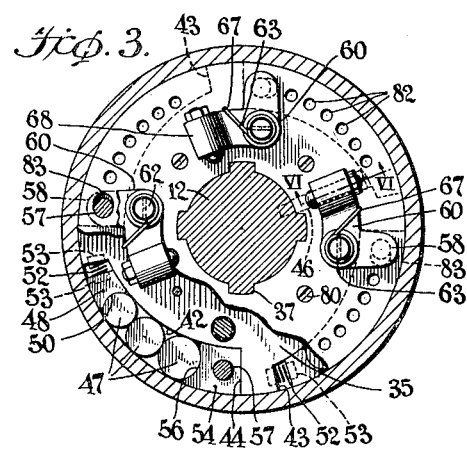
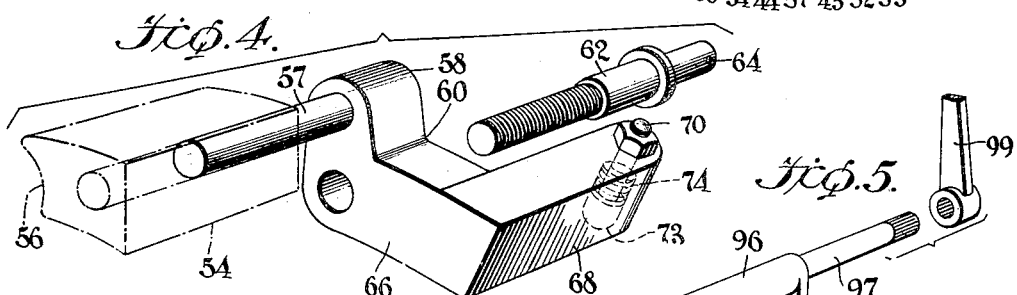
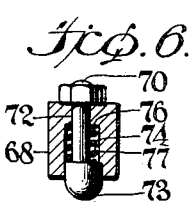
Inventor
Roy W. Parkinson
By
Bean, Brooks & Henry.
Attorneys.

Patented Mar. 13, 1934

1,950,694

UNITED STATES PATENT OFFICE 1,950,694

CLUTCH FOR MOTOR VEHICLES

Roy W. Parkinson, Buffalo, N. Y.

Application June 1, 1931, Serial No. 541,455

12 Claims. (Cl. 192—48)

This invention relates to clutches and it has particular relation to the type of clutches that is adapted to transmit power from a motor to the wheels of a vehicle or to other mechanical units.

One of the commonly known type of clutches includes clutching elements secured to driving and driven shafts in such manner as to be securely engaged until a suitable kind of lever or other operating device is employed for disengaging them. Later developments, especially in clutches for automobiles, include the so-called free wheeling feature, that is, the shafts which transmit power to the vehicle wheels are provided with a clutch mechanism effective only in one direction of rotation and upon discontinuing acceleration of the motor, the driven shaft overruns the driving shaft. Thus the motor simply idles without being affected by the mechanism or by the momentum of the vehicle.

The present invention involves a simplified and improved form of clutch which functions somewhat similarly to that just described, and is adapted to be employed as a connection between the driving and driven shafts of various types of machinery. This improved clutch is also particularly useful in its application to the driving and driven shafts of automotive vehicles for the purpose of providing the so-called free wheeling feature mentioned. Moreover, the invention is concerned with the provision of a clutch construction having a novel lever arrangement for controlling its operation, and including interchangeable elements which are operable to discontinue or resume the free wheeling feature at will.

For a better understanding of the invention reference may now be had to the accompanying drawing forming a part of this specification of which Fig. 1 is a fragmentary vertical section of a clutch and shaft construction embodying the invention;

Fig. 2 is a cross-section taken substantially along the line II—II of Fig. 1, certain operating parts of the device being shown in elevation;

Fig. 3 is a cross-section taken substantially along the line III—III of Fig. 1 with parts shown in elevation;

Fig. 4 is an exploded perspective, on a larger scale, of the devices for controlling certain members of the clutch construction;

Fig. 5 is an exploded perspective of a lever mechanism for actuating certain elements of the clutch; and Fig. 6 is a cross-section, on a larger scale, taken substantially along the line VI—VI of Fig. 3.

In practicing the invention a driven shaft 10 is coaxially aligned with a driving shaft 12, although the driven and driving relationship may be reversed according to the direction of rotation of the shafts. One end of the shaft 12 is smaller than and extends into a bored recess 13 of the adjacent end portion of the shaft 10. These end portions of the shafts are provided with circumferentially disposed rollers 14 and a thrust bearing 15. The end portion of the shaft 10 has an integral cylindrical casing 17 of greater diameter than the diameter of the body portion of this shaft, and has an integral radial wall portion 18 connecting the cylindrical casing to the shaft body.

A clutch cam 19 that is splined, as indicated at 20, upon an end portion of the shaft 12 is secured against axial movement relative to the shaft by means of a screw 21 threaded therethrough and into an opening 22 of the shaft 12. As best shown by Fig. 1, the inner surface of the wall 18 is substantially flush with the surface of the disc 19, but these surfaces do not frictionally contact or interfere with relative rotation of the disc cam and the wall.

The outer circumferential portion of the cam 19 is provided with a plurality of tapering arcuate recesses 23, each having an end wall 24 which is radially wider than its opposite radial wall 26. These recesses are closed by the cylindrical wall of the casing 17 which provides the outer enclosing surface of the tapering configuration of the recesses. A plurality of rollers 27 having different diameters are disposed in each recess 23, the larger roller being adjacent the wider wall 24 and normally resting against a slidable shoe 28 having a curved surface 29 to correspond to the curved surface of the adjacent roller 27. The shoe 28 fits loosely in the larger end portion of each recess 23 and a plurality of springs 30 have their ends disposed in opposed tapped openings 32 in each shoe 28 and in the wall 24 of each recess. These springs resiliently urge the bearing rollers 27 toward the wall 26 of the narrower end of each recess.

Another clutch cam 35 having a thin disc 36 separating it from the clutch cam 19 is splined, as indicated at 37, upon the shaft 12. Likewise the thin disc 36 is splined in the same manner upon the shaft 12, and is provided with openings 40 communicating with the recesses 23 to insure proper circulation of lubricant therein or to facilitate flushing out of the recesses, in the event they become clogged. These recesses also communicate in the same manner with tapering arcuate recesses 42 in the outer circumferential portions of the cam 35. Each recess 42 has an end wall 43 which is radially narrower than its opposite radial wall 44. Each of the recesses is closed by the cylindrical wall of the casing 17 which provides the outer enclosing surface of the tapering configuration of the recesses. After the cam 35 has been disposed adjacent the cam 19 it is secured rigidly against axial movement with respect to the shaft 12 by means of a screw 46 that is threaded therein and into the shaft.

A plurality of rollers 47 having different diameters are disposed in each recess 42, the smaller roller being adjacent the narrower wall 43 and normally resting against a shoe 48 having a curved surface 50 to correspond to the curved surface of the adjacent smaller roller 47. The shoe 48 fits loosely in the smaller end portion of the recess. A plurality of springs 52 are centered in tapped openings 53 in the shoes 48 and in the walls 43 of the recesses 42. These springs resiliently urge the rollers 47 toward the wall 44 and toward the wider end portion of each recess 42.

A shoe 54 similar to the shoe 48 is loosely mounted in the larger end portion of each recess 42 and is provided with a curved surface 56 corresponding to the normally contacting curved surface of the larger roller 47. Each shoe 54 has a pin 57 pivoted therein, the latter being integral with one arm 58 of a bell crank 60 that in turn is pivotally mounted upon a fulcrum pin 62 secured in the side wall of the clutch cam 35. A spring 63 secured in an opening 64 of the pin engages the other arm 66 of the bell crank, as indicated at 67 in Fig. 3 and constantly tends to pivot the bell crank in an anti-clockwise direction, as viewed in Fig. 3.

An integral lever arm 68 extending at right angles from the arm 66 and axially with respect to the shaft 12, is provided at its end portion with a bolt 70 that is slidably disposed in an opening 72 therein. As best shown by Fig. 6, one end of the bolt is provided with a spherical head 73 that projects beyond the surface of the arm 68. A coil spring 74 surrounding the bolt rests at one end against the head 73 and at its other end against a shouldered portion 76 of a recess 77 that is co-axial with respect to the opening 72. A disc 78 is secured, as indicated at 80, to the face of the clutch cam 35, it is splined upon the shaft 12, and is provided with openings 82 communicating with the recesses 42 for facilitating lubrication of the rollers 47 and other operating parts of the construction. Slots 83 are also provided in the disc 78 for permitting limited movement of the pins 57 therein when the bell cranks are pivoted upon the pins 62.

A sleeve 84 is splined, as indicated at 86, for axial sliding movement upon the shaft 12 and is provided with a spring pressed detent 87 that is snapped into either of the openings 88 or 89 by slidably moving the sleeve in the proper axial direction. One end portion of the sleeve is beveled as indicated at 90, for engaging the spherical heads 73 of the bolts 70 as the sleeve is slidably moved toward the clutch cam 35. The other end portion of the sleeve has a circumferential groove 92 in which lugs 93 at the end portions of depending legs 94 of a yoke 96 are disposed. A rod 97 rigidly secured through the yoke 96 is journaled in a rigid portion 98 of the vehicle, or other construction with which the apparatus is utilized, and is provided with a lever 99 for rotating the rod 97.

In operating the clutch construction, assuming that the shaft 12 is the driving shaft, the rotation thereof in a clockwise direction as viewed in Fig. 2, causes rollers 27 to be wedged in the recesses 23 against the inner surface of the cylindrical casing 17 and against the outer cam surfaces of the cam 19, thereby providing a clutching action which insures concurrent rotation of the shafts 10 and 12 in one direction. When driving power applied to the shaft 12 is discontinued and the momentum of the shaft 10 or the mechanism attached thereto tends to over run the shaft 12, the rollers 27 will be resiliently urged toward the wall 24 against the force offered by the shoes 28 and springs 30. Thus if this clutch is employed in an automobile for its driving shaft the so-called free wheeling effect is accomplished.

It will be observed that the circumferential direction of tapering of the recesses 23 in the clutch cam 19 is opposite the tapering direction of the recesses 42 in the clutch cam 35. Accordingly when the rollers 27 are binding, during the driving of the shaft 12, the rollers 47 are normally being urged by the springs 52 and shoes 48 toward the larger ends of the recesses 42 and against the shoes 54. If it is desired to dispense with the over-running or free wheeling effect of the shaft 10 with respect to the shaft 12, the operator actuates the lever 99, which can be connected for operation from the steering post of an automobile, thereby sliding the sleeve 84 to the left, as viewed in Fig. 1, until the beveled portion 90 of the sleeve slides beneath the spherical heads 73 in the end of the arms 68 and the heads rest upon the cylindrical portion of the sleeve. This manipulation causes the bell cranks 60 to be pivoted about the pins 62 in a clockwise direction, as viewed in Fig. 3, thereby moving the shoes 54 in the same direction until the rollers overcome the resistance offered by the springs 52 and bind within the recesses 42 against the clutch cam 35 and casing 17. In this position of the elements, relative rotation of the shafts 10 and 12 is prevented in either direction and the free wheeling effects no longer obtain because both of the clutch cams 19 and 35 are firmly secured by the rollers 27 and 47 with respect to the shaft 12. The rollers 27 bind in one direction of rotation while the rollers 47 bind when there is any tendency of the over-running action or relative rotation in the other direction of the shafts 10 and 12.

Both clutch cams 19 and 35 are identical in construction and are interchangeable. However, as previously indicated, they are so mounted in reversed relation as to have the recesses formed by the cam surfaces and the casing 17 converging in opposite circumferential directions. Since the space between the smaller roller 27 in each recess and the wall 26 is the same as the space between the smaller roller 47 and the wall 43, it will be apparent that the shoe 48 and spring 52 are adapted for use in the clutch cam 19 when it is interchanged with the clutch cam 35. Likewise, the shoes 28 are shaped to correspond with the shoes 54. Since these various parts are identical and can be interchanged, the cost of manufacture is reduced to a minimum and uniformity of product is insured.

From the foregoing description it will be apparent that the invention is applicable to driving shafts of motor vehicles and other mechanisms and that an extremely simple and efficient operation is provided for the purpose of obtaining the free wheeling action which is greatly desired in certain classes of automotive vehicles.

Although only one form of the invention has been shown and described in detail it will be apparent to those skilled in the art that the invention is not so limited but that various changes may be made therein without departing from the spirit of the invention or from the scope of the appended claims.

What I claim is:

1. A unit for transmitting power comprising a driving shaft, a driven shaft co-axially disposed with respect to the driving shaft, a casing provided on the end portion of the driven shaft, bearing elements between said shafts, a pair of clutch cams rigidly secured to the driving shaft within the casing, the clutch cams having tapered recesses circumferentially thereof, rollers of different diameters disposed in each recess, a spring pressed member in each recess, the recesses of one clutch cam being tapered oppositely from those of the other clutch cam to provide clutching action in opposite directions of rotation of the shafts, shoes in the recesses of one clutch cam member, bell cranks connected to the shoes and pivoted to the last mentioned clutch cam, and a sleeve slidable on the driving shaft to engage the bell cranks, whereby the latter urge the shoes against the rollers to insure clutching action through the latter rollers.

2. A unit for transmitting power consisting of a driving shaft, a driven shaft co-axially disposed with respect to the driving shaft, a casing provided at the end portion of the driven shaft, a pair of clutch cams rigidly secured to the driving shaft within the casing, the clutch cams having recesses circumferentially thereof and converging with respect to the surface of the casing, rollers disposed in the recesses, resilient means in each recess, shoes in the recesses of one clutch cam, bell cranks connected to the shoes and pivoted to the last mentioned clutch cam, and a sleeve slidable on the driving shaft to engage the bell cranks whereby the latter urge the shoes against the rollers to insure clutching action through the latter rollers.

3. A unit for transmitting power comprising a driving shaft, a driven shaft co-axially disposed with respect to the driving shaft, a casing provided on the end portion of the driven shaft, a pair of clutch cams rigidly secured to the driving shaft within the casing, the clutch cams having circumferentially disposed recesses therein converging with the surface of the casing, rollers disposed in the recesses, resilient means in each recess, shoes in the recesses of one clutch cam, a sleeve slidable on the driving shaft, and means connected to the shoes and operable by the sleeve, whereby the shoes are urged against the rollers to insure clutching action through the latter rollers.

4. A unit for transmitting power comprising a pair of co-axial shafts, a pair of clutch members rigidly secured to one shaft, roller clutching means disposed between the clutch members and the other shaft, means for insuring clutching action of the rollers of one clutch member in one direction only of relative rotation of the shaft, means to insure clutching action of the rollers in the other clutch member in the other direction only of relative rotation of the shafts, a resiliently mounted bell crank secured to one of the clutch members, and means for operating the bell crank to engage and disengage the roller clutching means from the last mentioned clutch member, said other clutch member and roller clutching means being automatically operable for clutching action in one direction of rotation of the shafts and to discontinue clutching action in the other direction of relative rotation of the shafts.

5. A unit for transmitting power comprising a pair of co-axial shafts, a one-way clutch cam having rigid connections to one of the shafts, a second one-way clutch cam having rigid connection to the same shaft, oppositely operable clutch elements operatively associated with the clutch cams and with the other shaft for preventing relative rotation of the shafts, a bell crank connected to a clutching element of the second one-way clutch member, and means slidable on one of the shafts for actuating the bell crank thereby either releasing or engaging the second element of the second clutch cam with respect to the other shaft.

6. A unit for transmitting power comprising a pair of co-axial shafts, a one-way clutch member having rigid connections to one of the shafts, a second one-way clutch member having rigid connections to the same shaft, oppositely operable clutching elements operatively associated with the clutch members and with the other shaft, a series of bell cranks connected to clutching elements of the second one-way clutch member, a sleeve slidable on one of the shafts for actuating the bell cranks, and means for actuating the sleeve.

7. A unit for transmitting power comprising a pair of co-axial shafts, one of which is driven, a pair of clutch members rigidly secured to one of the shafts, the other shaft including a circumferential portion surrounding the clutch members, means between each clutch member and the circumferential portion to provide for rotation of the shafts concurrently in one direction, and a member slidable upon one of the shafts to disengage said means from effective cooperation with one of the clutch members.

8. A unit for transmitting power comprising a pair of co-axial shafts, a pair of reversely effective one-way clutch cams having rigid connections to one of the shafts, clutching elements operatively associated with the clutch cams, bell cranks mounted on one of the clutch cams for controlling the position of the clutching elements, and means for operating the bell cranks, whereby both cams combine for locking relation with both shafts.

9. A unit for transmitting power comprising a pair of co-axial shafts, a pair of reversely operating clutches having clutching elements therein for connecting the shafts, levers pivoted to one of the clutches, means for connecting the levers to said clutching elements of one clutch, and means for actuating the levers, to lock the latter clutch whereby both clutches provide operation of both shafts as a unit in either direction of rotation.

10. A power transmitting unit comprising a pair of shafts, a pair of clutch constructions connecting the shafts, clutching elements included in said constructions, a lever pivoted to one of the clutch constructions, an extension on the lever, means on one of the shafts for engaging the lever extension, and means connecting the clutching elements of one clutch construction to the lever, whereby the two shafts are selectively connected for either relative rotation or rigidly connected for concurrent rotation.

11. A power transmitting unit comprising a pair of shafts, a pair of interchangeable clutch cams providing connections between the shafts, clutching elements interchangeable in the respective cams for insuring clutching action in both directions of relative rotation of the shafts, and means associated with one of the cams for discontinuing clutching effect thereof and permitting free relative rotation of the shafts in one direction.

12. A power transmitting device comprising a pair of coaxial shafts one of which is driven, a clutch unit rigidly secured to one of the shafts, the other shaft having a circumferential portion surrounding the clutch unit for clutching engagement therewith, said clutch unit having a set of clutching elements operable to establish driving connection between the shafts in one direction of rotation, said clutch unit having a set of clutching elements operable to establish driving connection between the shafts in the other direction of rotation, lever mechanism mounted on the clutch unit and engaging portions of one of the sets of clutch elements to establish or discontinue driving connection between the shafts, and means for operating the lever mechanism.

ROY W. PARKINSON.